(12) United States Patent
Beebe et al.

(10) Patent No.: US 6,523,559 B2
(45) Date of Patent: Feb. 25, 2003

(54) SELF-REGULATING MICROFLUIDIC DEVICE AND METHOD OF USING THE SAME

(75) Inventors: David J. Beebe, Madison, WI (US); Jeffrey S. Moore, Savory, IL (US); Robin Liu, Chandler, AZ (US); David T. Eddington, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/917,523

(22) Filed: Jul. 27, 2001

(65) Prior Publication Data

US 2003/0019520 A1 Jan. 30, 2003

(51) Int. Cl.$^7$ .............................................. G05D 11/03
(52) U.S. Cl. ............................................ 137/3; 137/93
(58) Field of Search ................................ 137/3, 88, 93, 137/89, 91, 92; 236/12.14

(56) References Cited

U.S. PATENT DOCUMENTS 2,807,421 A * 9/1957 Carlson ............... 126/343.5 A
2,910,242 A * 10/1959 Freismuth et al. ........ 137/625.4
5,641,410 A * 6/1997 Peltzer ........................... 137/5
6,136,212 A * 10/2000 Mastrangelo et al. ......... 216/27
6,201,980 B1 * 3/2001 Darrow et al. ............... 600/345

* cited by examiner

Primary Examiner—Stephen M. Hepperle
(74) Attorney, Agent, or Firm—Boyle Fredrickson Newholm Stein & Gratz S.C.

(57) ABSTRACT

In accordance with the present invention, a microfluidic device and method of using the same is provided for self-regulating the flow of fluid therethrough. The microfluidic device includes a body defining first and second flow channels. The first flow channel has an input for receiving the fluid and an output. The second flow channel has an input for receiving a compensating fluid to modify the value of the property of the fluid and an output communicating with the first flow channel. A polymeric material is disposed in the first flow channel downstream of the output of the second flow channel. The polymeric material has a volume responsive to the value of the property of the fluid. A valve is disposed in the second flow channel and is movable in response to the volume of the material. The valve is movable between the first open position allowing the compensating fluid to flow past the valve into the first flow channel and a second closed position limiting the flow of compensating fluid therepast.

29 Claims, 4 Drawing Sheets

SELF-REGULATING MICROFLUIDIC DEVICE AND METHOD OF USING THE SAME

REFERENCE TO GOVERNMENT GRANT

This invention was made with United States government suport awarded by the following agencies: DOD ARPA F33615-98-1-2853. The United States has certain rights in this invention.

FIELD OF THE INVENTION

This invention relates generally to microfluidic devices, and in particular, to a microfluidic device and method of using the same to self-regulate various fluid parameters in a microfluidic system.

BACKGROUND AND SUMMARY OF THE INVENTION

As is known, living systems maintain homeostasis via a variety of feedback control schemes. For example, in the human body, control is realized at all scales, from the whole body (e.g., temperature) down to the single cell (e.g., membrane potential). It can be appreciated that it is highly desirable to provide a manmade device that detects and self-regulates any selected chemical change, physical change, chemical agent or biological agent in the human body. However, manmade devices or control systems typically require some sort of power supply and/or electronics in order to function properly. In contrast to the various control systems engineered by man, in vivo control is achieved solely through organic materials and chemical mechanisms.

In an attempt to develop systems for these complex functions in the human body, research has been conducted in the area of microelectro-mechanical (MEM) systems or microsystems. Microsystems are considered to be any device or unit made up of a number of microengineered and/or micromachined components, such as miniature pumps and values. Due to various innovations in the integrated circuit industry (e.g., micromachining), the development of microsystems has progressed rapidly. For example, microsystems are now widely used in academia and in a number of commercially successful products that incorporate microengineered and/or micromachined components. Recently, microfluidic devices have emerged as a useful tool in research and clinical medicine. Despite these advances, there are still significant limitations to current microsystem technology.

While silicon-based microsystems have proven well suited to optical and physical sensing applications, the application of silicon-based devices to medical and biological applications is not straightforward. Silicon-based approaches typically rely on actuation methods (electrostatic, thermal, electromagnetic) that are not suitable for direct interface with liquid and organic systems. In addition, the integration of microscale valves and other microscale components into microfluidic devices has proven problematic. Often, the manufacturing process that provides a useful microscale valve is vastly different from the manufacturing process that provides a useful microscale pump or sensor. Hence, different device components necessarily require different materials for construction and different types of manufacturing steps. As a result, the integrating of several microengineered components into a single microdevice is both time consuming and expensive.

Therefore, it is a primary object and feature of the present invention to provide microfluid device that is capable of self-regulating a fluid stream therethrough.

It is a further object and feature of the present invention to provide a microfluidic device that is simple and inexpensive to manufacture.

It is a further object and feature of the present invention to provide a microfluidic device that overcomes the limitations of prior microdevices.

In accordance with the present invention, a microfluidic device is provided for modifying the value of a property of a fluid. The microfluidic device includes a body defining first and second flow channels therethrough. The first flow channel has an input end for receiving the fluid and an output end. The second flow channel has an input end for receiving a compensating fluid to modify the value of the property of the fluid and an output end communicating with the first flow channel. A polymeric material is positioned in the first flow channel downstream of the output end of the second flow channel. The polymeric material has a volume responsive to the value of the property of the fluid. As such, the material as a first volume in response to the property having a first value and a second volume in response to the property having a second value. A valve is disposed in the second flow channel and is movable in response to the volume of the material. The valve is movable between an open position allowing the compensating fluid to flow therepast into the first flow channel and a closed position limiting the flow of compensating fluid therepast.

It is contemplated the first flow channel of the body extend along a longitudinal axis and the output end of the second flow channel of the body be transverse to the longitudinal axis of the first flow channel. Further, the polymeric material extends along an axis transverse to the longitudinal axis of the first flow channel and parallel to the output end of the second flow channel of the body. The second flow channel includes first and second portions. The first portion of the second flow channel includes the input end of the second flow channel and has an output orifice. The second portion of the second flow channel has an input communicating with the output orifice and includes the output end of the second flow channel. The first portion of the second flow channel is generally L-shaped and has a first leg extending from the input end of the second flow channel and a second leg perpendicular thereto. Similarly, the second portion of the second flow channel is generally L-shaped and has a first leg extending from the output orifice of the first portion of the second flow channel and a second leg perpendicular thereto.

The valve of the microfluidic device includes a membrane which overlaps at least a portion of the output orifice of the first portion of the second flow channel with the valve in the closed position and which is spaced from the output orifice with the valve in the open position. It is contemplated that the membrane be integrally formed with the body and that the output orifice of the first portion of the second flow channel have a generally star-shaped cross-section.

In accordance with a further aspect of the present invention, a microfluidic device is provided for modifying the value of a property of a fluid. The microfluidic device includes a body which defines a first flow channel, a first compensating channel, a second compensating channel and a valve chamber. The first flow channel extends along a longitudinal axis and has an input end for receiving the fluid and an output end. The first compensating channel has an input end for receiving a compensating fluid and a second end terminating at an orifice. The second compensating channel has an input communicable with the orifice of the first compensating channel and an output communicating with the first flow channel. The valve chamber extends through and communicates with the first flow channel. A membrane is positioned within the body and isolates the valve chamber from the second compensating channel. A polymeric material is positioned in the valve chamber downstream of the output of the second compensating channel. The polymeric material is operatively engageable with the membrane for controlling the flow of compensating fluid through the orifice of the first compensating channel into the second compensating channel.

The second compensating channel includes an end portion adjacent the output thereof. The end portion of the second compensating channel is transverse to the longitudinal axis of the first flow channel. The polymeric material also extends along an axis transverse to the longitudinal axis of the first flow channel and is parallel to the end portion of the second compensating channel. The first compensating channel is generally L-shaped and has a first leg extending from the input end thereof and a second leg perpendicular thereto. The second compensating channel is also generally L-shaped and has a first leg overlapping the orifice of the first compensating channel and a second leg perpendicular thereto.

It is contemplated that the polymeric material have a volume which is responsive to the value of the property of the fluid. The material has a first volume in response to the property of the fluid having a first value such that the membrane overlaps the orifice and a second volume in response to the property of the fluid having a second value wherein the membrane is spaced from the orifice. The volume of the polymeric material may be pH responsive.

In accordance with a still further aspect of the present invention, a method is provided for modifying the value of a property of a fluid using a micro fluidic device. The method includes the steps of providing a first flow path through the microfluidic device to accommodate the flow of fluid therethrough. A material having a volume is positioned in the flow path. The volume of the material is responsive to the value of the property of the fluid. A volume of compensating fluid is introduced to the flow path to vary the value of the property of the fluid. The volume of the compensating fluid introduced varies in response to the volume of the material.

The method may include the additional step of providing a second flow path in the microfluidic device to accommodate the flow of the compensating fluid therethrough. The second flow path has first and second portions wherein the first portion communicates with the second portion through an orifice and the second portion communicates with the first flow path upstream of the material. A material chamber is provided in the microfluidic device transverse to and extending through the first flow path. The material is positioned within the material chamber and isolated from the second flow path by a membrane which extends between the material chamber and the second flow path.

The step of introducing the volume of the compensating fluid into the first flow path may also include the steps of urging the membrane over the orifice in the first portion of the second flow chamber so as to limit the flow of compensating fluid therethrough in response to the value of the property of the fluid being the first value and opening the orifice in the first portion of the second flow chamber so as increase the flow of compensating fluid therethrough in response to the value of the property of the fluid being the second value. The volume of the compensating fluid is introduced into the first flow path at a predetermined angle thereto. The predetermined angle is generally equal to 90°. Further, the compensating fluid may be introduced into the first flow path such that the fluid and the compensating fluid flow in the first flow path is in a laminar arrangement.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
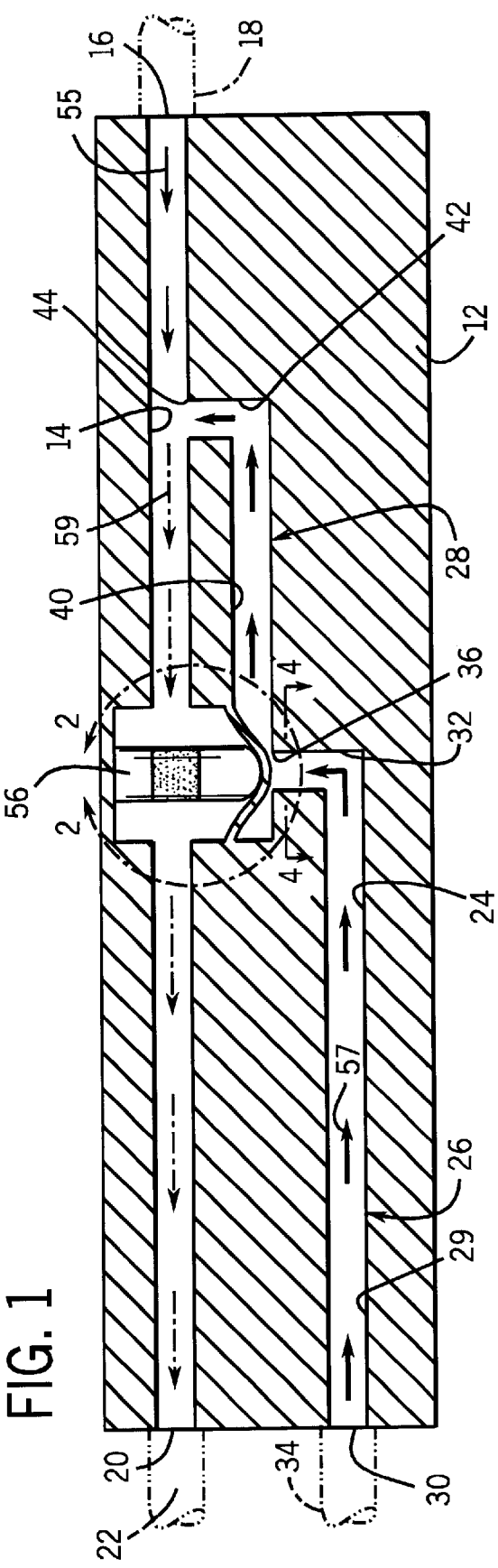
FIG. 1 is a schematic, cross-sectional view of a microfluidic device in accordance with the present invention.

Referring to FIG. 1, a microfluidic device in accordance with the present invention is generally designated by the reference numeral 10. Microfluidic device 10 includes a body 12 having a first flow channel 14 extending therethrough. First flow channel 14 includes an input 16 operatively connected to a fluid source in any conventional manner such as by tube 18. The first flow channel 14 further includes an output 20 operatively connected to a target in a conventional manner, such as by tube 22.

Figure 4:
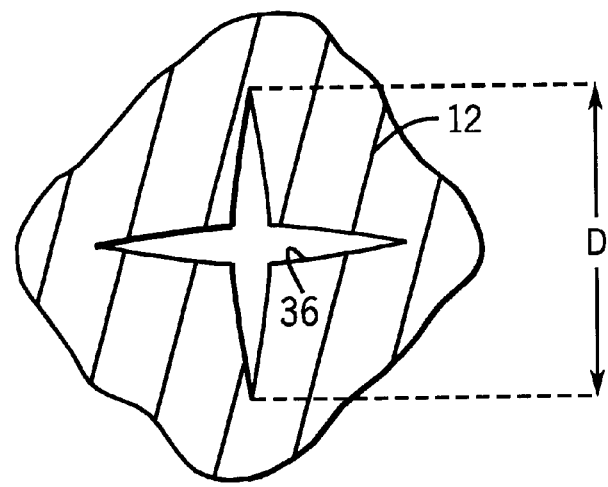
FIG. 4 is a cross-sectional view of the microfluidic device of the present invention taken along line 4—4 of FIG. 1.
Figure 5:
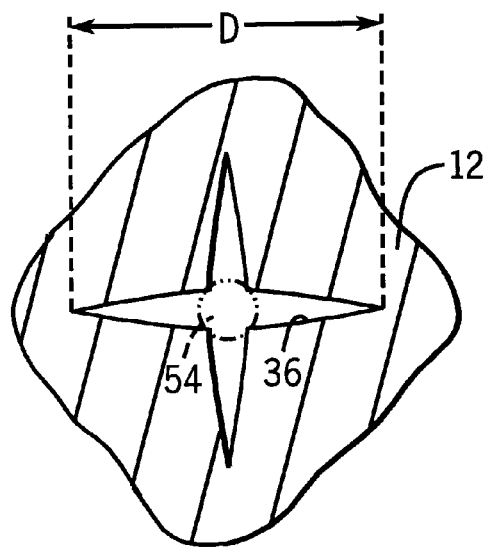
FIG. 5 is a cross-sectional view of the microfluidic device of the present invention taken along line 5—5 of FIG. 2.
Figure 6:
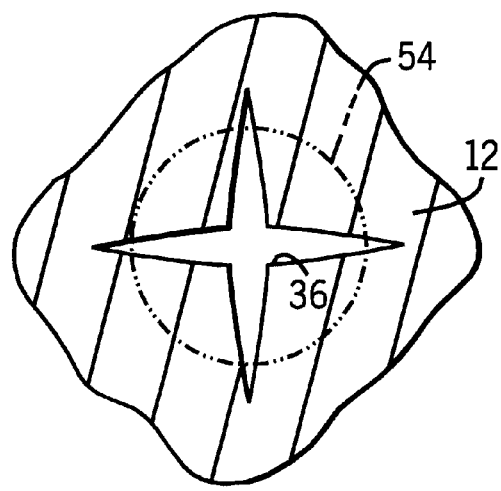
FIG. 6 is a cross-sectional view of the microfluidic device of the present invention taken along line 6—6 of FIG. 3.

Microfluidic device 10 further includes a second flow channel 24 having a first generally L-shaped portion 26 and a second generally L-shaped portion 28. First portion 26 of second flow channel 24 is defined by first and second legs 29 and 32, respectively. First leg 29 of first portion 26 of second flow channel 24 has an input 30 connectable to a compensating fluid source in any conventional manner, such as by tube 34. The output of first leg 29 of first portion 26 of second flow channel 24 communicates with the input of second leg 32 of first portion 26 of second flow channel 24. Second leg 32 of first portion 26 of second flow channel 24 terminates at an orifice 36. As best seen in FIGS. 4–6 orifice 36 at the terminal end of second leg 32 of first portion 36 of second flow channel 24 has a generally star-shaped cross-section, for reasons hereinafter described.

Orifice 36 at the terminal end of second leg 32 of first portion 26 of second flow channel 24 communicates with first leg 40 of second portion 28 of second flow channel 24. Second portion 28 of second flow channel 24 is generally L-shaped such that the output of first leg 40 of second portion 28 of second flow channel 24 communicates with the input of second leg 42 of second portion 28 of second flow channel 24. Output 44 is provided at the terminal end of second leg 42 of second portion 28 of second flow channel 24 and communicates with first flow channel 14 downstream of input 16 thereof.

It is contemplated that first legs 29 and 40 of corresponding portions 26 and 28, respectively, of second flow channel 24 be generally parallel to each other and to first flow channel 14. Further, it is contemplated that second legs 32 and 42 of corresponding portions 26 and 28, respectively, of second flow channel 24 be generally parallel to each other and perpendicular to first flow channel 14.

Figure 3:
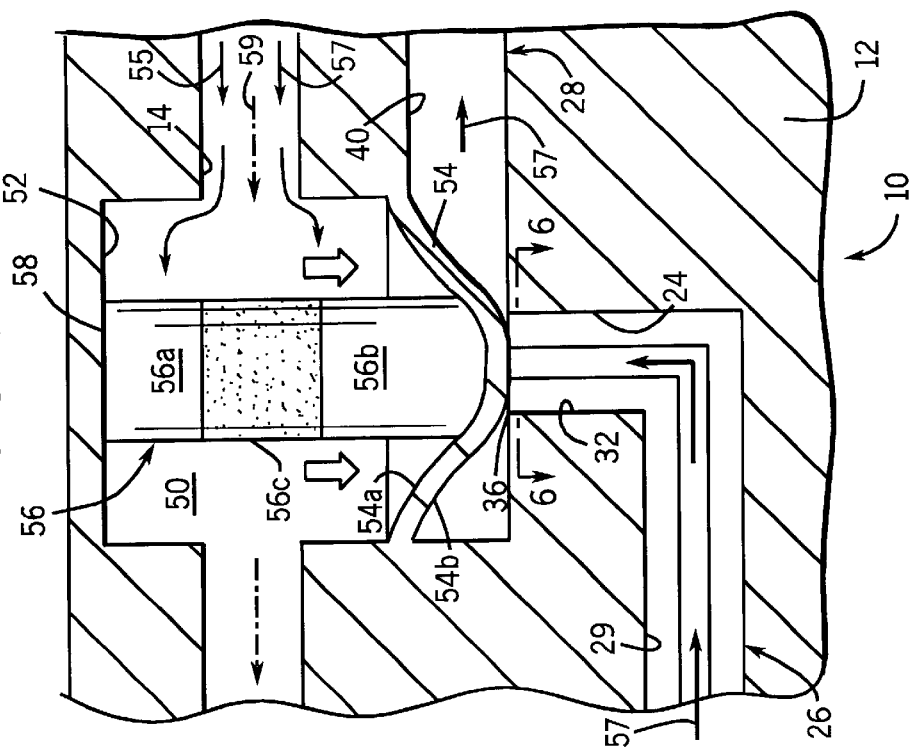
FIG. 3 is a cross-sectional view, similar to FIG. 2, showing the membrane of a microfluidic device in a second position.
Figure 2:
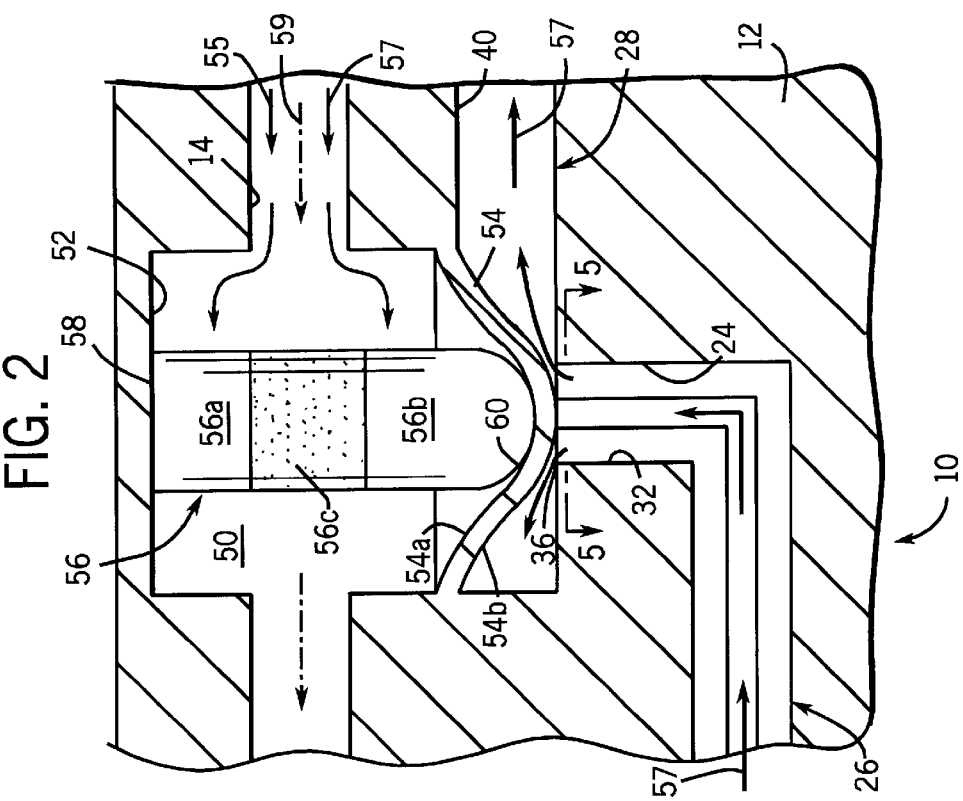
FIG. 2 is an enlarged, cross-sectional view of the microfluidic device of the present invention taken generally along line 2—2 of FIG. 1 showing the membrane of the microfluidic device in a first position.

Referring to FIGS. 2–3, body 12 of microfluidic device 10 further includes a material chamber 50 which is transverse to and communicates with first flow channel 14. Material chamber 50 is defined by a generally horizontal, upper surface 52 formed in body 12 and a membrane 54 vertically spaced from upper horizontal surface 52. Membrane 54 is integrally formed with body 12 and serves to isolate material chamber 50 from first leg 40 of second portion 28 of second flow channel 24. Membrane 54 includes an upwardly directed surface 54a which is directed towards the interior of material chamber 50 and a downwardly directed surface 54b directed towards orifice 36 at the terminal end of second leg 32 of first portion 26 of second flow channel 24. In the preferred embodiment, membrane 54 is flexible and resilient and is formed from polydimethylsiloxane (PDMS).

Post 56 is positioned within material chamber 50 in body 12. Post 56 includes an upper end surface 58 which engages upper surface 52 within body 12 and a semispherical lower surface 60 which engages upper surface 54a of membrane 54 such that post 56 is retained in position within material chamber 50 by contact pressure. Post 56 is formed from a polymeric organic material such as a hydrogel which is volumetrically responsive to a selected fluid parameter such as temperature, light, pH or the like. By way of example, operation of microfluidic device 10 is described hereinafter in conjunction with post 56 being formed of a hydrogel which is volumetrically responsive to pH. However, it is contemplated that post 56 be formed of other types of polymeric organic materials without deviating from the scope of the present invention.

It can be appreciated that a self-regulating pH system has a plurality of applications including sequence determination of proteins, DNA analysis, as well as, others. For example, it is known that many biologicals remain stable only within a small window of pH. Hence, pH control is necessary when a process, in and of itself, alters the pH causing irreparable damage to biologicals (e.g., base is produced by protein degradation and acid by carbohydrate metabolism). For chemical or biochemical processes that consume or produce hydrogen ions, it is therefore desirable to have a system that continuously monitors and regulates the pH of the solution.

It is intended that post 56 act as the single active element in microfluidic device 10 so as to eliminate the need for any external power sources and/or electronics. Post 56 acts both as a pH sensor and as an actuator by changing volume when exposed to different pH values. At low pH values, FIG. 2, post 56 constricts to its shrunken volume and at high pH, FIG. 3, post 56 fully expands to its expanded volume. As hereinafter described, this volume change of post 56 deforms membrane 54 such that the deformation of membrane 54 partially occludes orifice 36 (based on the amount of swelling of post 56) in order to regulate the feedback of a stream 57 of compensating fluid, such as a basic buffer solution, into first flow channel 14.

In the preferred embodiment, microfluidic device 10 is formed by compression micromolding, layered manufacturing and in situ liquid phase polymerization. Through compression micromolding of a polydimethylsiloxane (PDMS) elastomer, three two-dimensional layers are fabricated. A mixture of PDMS prepolymer and a curing agent is poured onto an epoxy based photoresist (EPON) mold master with a transparency, glass, and aluminum discs placed on top. Under compression (e.g., 100 lbs.), the stacked structure is maintained at a predetermined temperature (e.g., 75° Celsius) for a predetermined time period (e.g., approximately 2 hours) to realize thru holes in the PDMS layers. The upper most PDMS layer is processed under reduced compression (e.g., 1 lb.) to allow a membrane to form over the EPON mold master. The membrane is then manually removed from most of the upper most layer to form membrane 54, as heretofore described. The layers are then activated in an oxygen plasma to provide a permanent bond therebetween. It is noted that the layers are aligned under a stereoscope using methanol as a surfactant between the layers. Alignment of the layers is realized by manual manipulation of the layers, aided by surface tension effects.

It has been found that successful operation of microfluidic device 10 as a pH regulation system depends on the geometry of orifice 36. For example, if orifice 36 has a circular cross-section, it has been found that as post 56 expands, membrane 54 completely seals orifice 36 so as to stop the stream of compensating fluid from flowing therethough. With stream of compensating fluid stopped, post 56 shrinks thereby opening orifice 36 so as to allow for the stream of compensating fluid to flow therethough. This on/off control of the compensating fluid results in a pH regulation system that lacks stability.

Alternatively, by providing orifice 36 with a star shaped cross-section, as illustrated in FIGS. 4–6, orifice 36 operates similar to a throttle for the stream 57 of compensating fluid and eliminates the oscillatory response of the circular orifice heretofore described. By way of example, the diameter of post 56 may be provided in the range of 300 to 600 $\mu$m and the tip-to-tip distance "D" of orifice 36 may be provided as 500 $\mu$m. As post 56 fully expands to 600 $\mu$m, orifice 36 is completely sealed by membrane 54. It can be appreciated the orifice 36 will produce a flow gradient of compensating fluid dependent on the diameter of post 56 occluding orifice 36. The portion of membrane 54 that seals orifice 36 is directly correlated to the size of post 56 deforming membrane 54.

In operation as a pH regulation system, an input stream 55 of fluid (e.g., having a low pH) is provided at input 16 of first flow channel 14 and input stream 57 of compensating fluid (e.g., having a high pH) is provided at input 30 of first portion 26 of second flow channel 24. As the stream 55 of fluid flows though first flow channel 14, stream 55 passes through material chamber 50 and engages post 56. As heretofore described, as stream 55 flows through material chamber 50 and engages post 56, post 56 shrinks so as to cause membrane 54 to seal off a smaller portion of orifice 36. As a result, more compensating fluid is allowed to pass through orifice 36, and hence, through second portion 28 of second flow channel 24 into first flow channel 14 thereby increasing the overall pH of the fluid flowing through first flow channel 14 downstream of output 44 of second leg 42 of second portion 28 of second flow channel 24.

Since the pH regulation system herein described operates at a low Reynolds number (Re~100) and the compensating fluid is injected into the input stream 55 of fluid in first flow channel 14 from the bottom, a laminar flow of the stream 57 of compensating fluid and of the stream 55 of fluid in first flow channel 14 results. Consequently, the two streams 55 and 57 are stacked vertically within first flow channel 14 such that the stream 55 of the fluid is on the top of first flow channel 14 and the stream 57 of compensating fluid is on the bottom.

The stacking of the two streams 55 and 57 causes post 56 to form into a slightly conical shape, FIGS. 1–3. It can be appreciated that top portion 56a of post 56 will be continually exposed to stream 55 of the fluid and bottom portion 56b of post 56 will be continually exposed to stream 57 of compensating fluid. Note that if the stream 57 of compensating fluid and the stream 55 of the fluid mix rapidly, the entirety of post 56 would expand and contract uniformly to deform membrane 54. However, given the laminar flow of the two streams 55 and 57, diffusion occurs at the interface 59 of the two streams 55 and 57. Consequently, only small central portion 56c of post 56 changes in volume thereby effectively minimizing the active region of the post 56 that acts as an actuator. It has been found that minimizing the active region of post 56 that acts as the actuator improves the response time of post 56 to changes in pH. In addition, it has been found that varying the flow rates of the two streams 55 and 57 translates into different diffusion widths.

It can be appreciated that the appropriate use of microscale phenonomena (laminar flow) and geometries (orifice shape) allow a designer parametric control of microfluidic device 10. Further, as heretofore described, microfluidic device 10 may be utilized in various applications simply by forming post 56 from other types of materials such as hydrogels that change with exposure to temperature, light, and biologicals. consequently, it can be understood from the present description that microfluidic device 10 may be modified so as to regulate other parameters, facilitating use across many applications. For example, post 56 may be formed of a hydrogel sensitive to biologicals, such as glucose concentration of the patient's blood. Post 56 could be provided in the input stream to regulate the output of microfluidic device 10 to carry a desired amount of insulin into the blood.

Figure 7B:
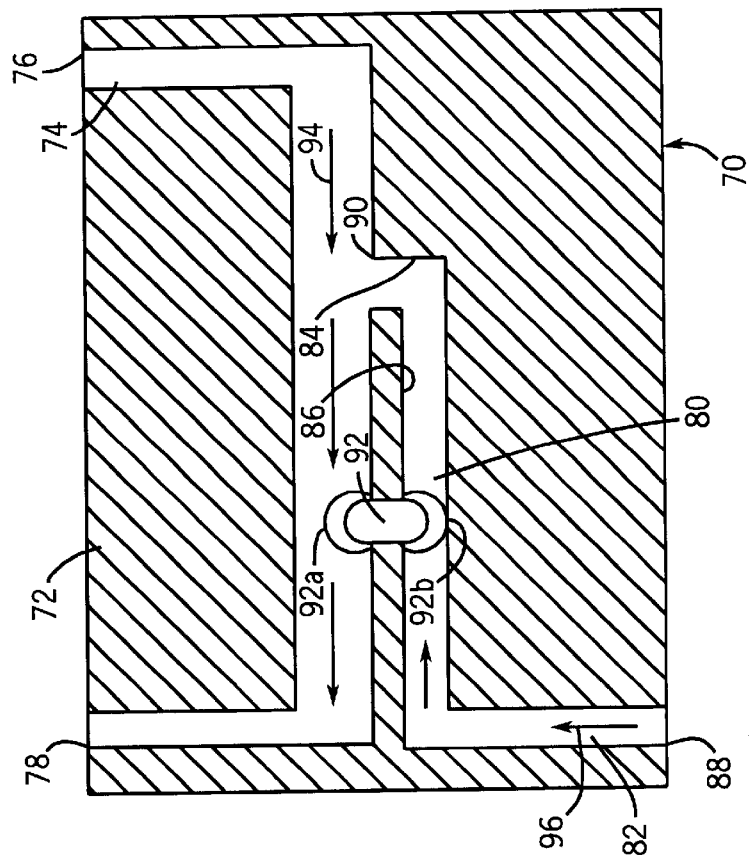
FIG. 7b is a cross-sectional view, similar to FIG. 7a, showing the valve of the second embodiment of the microfluidic device in a closed position.
Figure 7A:
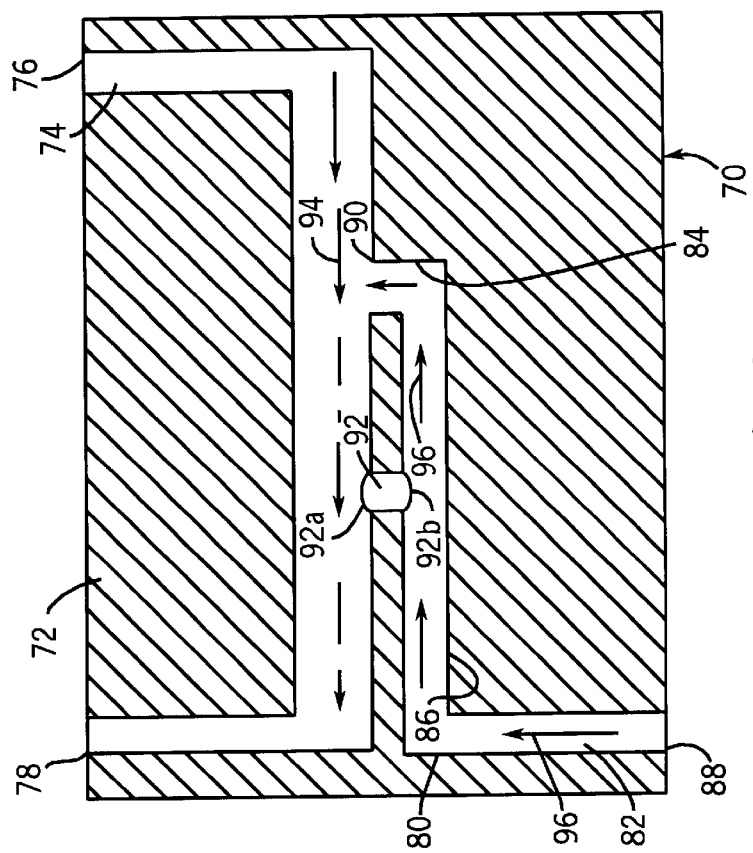
FIG. 7a is a cross-sectional view of a second embodiment of a microfluidic device in accordance with the present invention showing the valve thereof in an open position.

Referring to FIGS. 7a–7b, a second embodiment of a microfluidic device in accordance with the present invention is generally designated by the reference numeral 70. Microfluidic device 70 includes a body 72 having a first flow channel 74 extending therethrough. First flow channel 74 includes an input 76 operatively connected to a fluid source in any conventional manner and an output 78 operatively connected to a target in any conventional manner.

Microfluidic device 70 includes a second flow channel 80 having generally parallel, input and output portions 82 and 84, respectively, interconnected by a central portion 86 perpendicular thereto. Input portion 82 of second flow channel 80 includes an input 88 connectable to a compensating fluid source in any conventional manner. Output 90 of output portion 84 of second channel 80 communicates with first flow channel 74.

A valve element 92 extends between first flow channel 74 and central portion 86 of second flow channel 80 such that a first end 92a of valve element 92 communicates with first flow channel 74 downstream of output 90 in output portion 84 of second flow channel 80 and a second end 92b of valve element 92 communicates with central portion 86 of second flow channel 80. It is contemplated that valve element 92 be formed from a polymeric organic material such as a hydrogel which is volumetrically responsive to a selected fluid parameter such as temperature, light, pH or the like. As heretofore described with respect to microfluidic device 10, operation of microfluidic device 70 is described hereinafter in conjunction with valve element 92 being formed of a hydrogel which volumetrically responsive to pH. However, it is contemplated that valve element 92 be formed of other types of polymeric organic materials without deviating from the scope of the present invention.

In operation as a pH regulation system, an input stream 94 of fluid (e.g., having a low pH) is provided at input 76 of first flow channel 74 and an input stream 96 of compensating fluid (e.g., having a high pH) is provided at input 88 of input portion 82 of second flow channel 80, FIG. 7b. In its initial configuration, second end 92b of valve element 92 is of sufficient dimension so as to block central portion 86 of second flow channel 80 and prevent input stream 96 of compensating fluid to flow therepast. As input stream 94 of fluid flows through first flow channel 74 and engages first end 92a of valve element 92, valve element 92 shrinks so as to cause second end 92b of valve element 92 to seal off a smaller portion of central portion 86 of second flow channel 80, FIG. 7a. As a result, stream 96 is allowed to flow through second flow channel 80 past second end 92b of valve element 92, and hence, through output 90 in output portion 84 of second flow channel 80 into first flow channel 74. It can be appreciated that the flow gradient of compensating fluid is dependent on the volume of the second end 92b of valve element 92.

As more compensating fluid is allowed to pass through second flow channel 80 into first flow channel 74, the overall pH of the fluid flowing through first flow channel 74 increases. Further, as the overall pH of the fluid flowing through first flow channel 74 increases, valve element 92 expands so as to cause second end 92b of valve element 92 to seal off a greater portion of central portion 86 of second flow channel 80. As a result, when the overall pH of the fluid flowing through first flow channel 74 exceeds a predetermined value, second end 92b of valve element 92 blocks central portion 86 of second flow channel 80 and prevents input stream 96 of compensating fluid to flow therepast. In such a manner, microfluidic device 70 has the ability to control the overall pH of the fluid flowing through first flow channel 74.

Various modes of carrying out the invention are contemplated as being within the scope of the following claims particularly pointing out and distinctly claiming the subject matter which is regarded as the invention.

We claim:

1. A microfluidic device for modifying the value of a property of a fluid, comprising:

a body defining:
  a first flow channel having an input end for receiving the fluid and an output end;
  a second flow channel having an input end for receiving a compensating fluid to modify the value of the property of the fluid and an output end communicating with the first flow channel;
a polymeric material positioned in the first flow channel downstream of the output end of the second flow channel and having a volume responsive to the value of the property of the fluid, the material having a first volume in response to the property having a first value and a second volume in response to the property having a second value; and
a valve disposed in the second flow channel and being movable in response to the volume of the material between a first open position allowing the compensating fluid to flow therepast into the first flow channel and a closed position limiting the flow of the compensating fluid therepast.

2. The microfluidic device of claim 1 wherein the first flow channel of the body extends along a longitudinal axis and wherein the output end of the second flow channel of the body is transverse to the longitudinal axis of first flow channel of the body.

3. The microfluidic device of claim 2 wherein the polymeric material extends along an axis transverse to the longitudinal axis of the first flow channel and parallel to the output end of the second flow channel of the body.

4. The microfluidic device of claim 1 wherein the second flow channel includes:
   a first portion including the input end of the second flow channel and an output orifice; and
   a second portion having an input communicating with the output orifice and including with the output end of the second flow channel.

5. The microfluidic device of claim 4 wherein the first portion of the second flow channel is generally L-shaped and has a first leg extending from the input end of the second flow channel and being generally parallel to the first flow channel and a second leg perpendicular thereto.

6. The microfluidic device of claim 4 wherein the second portion of the second flow channel is generally L-shaped and has a first leg extending from the output orifice of the first portion of the second flow channel and being generally parallel to the first flow channel and a second leg perpendicular thereto.

7. The microfluidic device of claim 4 wherein the valve includes a membrane, the membrane overlapping at least a portion of the output orifice with the valve in the closed position and the membrane spaced from the output orifice with the valve in the open position.

8. The microfluidic device of claim 7 wherein the output orifice has a generally star-shaped cross-section.

9. The microfluidic device of claim 7 wherein the membrane is integrally formed with the body.

10. The microfuidic devide of claim 1 wherein the volume of the polymeric material is pH responsive.

11. A microfluidic device for modifying the value of a property of a fluid, comprising:
   a body defining:
      a first flow channel extending along a longitudinal axis, the first flow channel having an input end for receiving the fluid and an output end;
      a first compensating channel having an input end for receiving a compensating fluid and a second end terminating at an orifice;
      a second compensating channel having an input communicatable with the orifice of the first compensating channel and an output communicating with the first flow channel;
      a valve chamber extending through and communicating with the first flow chamber;
   a membrane positioned within the body and isolating the valve chamber from the second compensating channel; and
   a polymeric material positioned in the valve chamber downstream of the output of the second compensating channel and operatively engagable with the membrane so as to provide fluidic resistance to the flow of compensating fluid from the orifice of the first compensating channel into the second compensating channel.

12. The microfluidic device of claim 11 wherein the second compensating channel includes an end portion adjacent the output thereof and wherein the end portion of the second compensating channel is transverse to the longitudinal axis of first flow channel.

13. The microfluidic device of claim 12 wherein the polymeric material extends along an axis transverse to the longitudinal axis of the first flow channel and parallel to the end portion of the second compensating channel.

14. The microfluidic device of claim 11 wherein the first compensating channel is generally L-shaped and has a first leg extending from the input end thereof and being generally parallel to the first flow channel and a second leg perpendicular thereto.

15. The microfluidic device of claim 11 wherein the second compensating channel is generally L-shaped and has a first leg overlapping the orifice of the first compensating channel and being generally parallel to the first flow channel and a second leg perpendicular thereto.

16. The microfluidic device of claim 11 wherein the polymeric material has a volume responsive to the value of the property of the fluid, the material having a first volume in response to the property of the fluid having a first value wherein the membrane provides a first fluidic resistance to the flow of compensating fluid and a second volume in response to the property of the fluid having a second value wherein the membrane provides a second fluidic resistance to the flow of compensating fluid.

17. The microfluidic device of claim 16 wherein the volume of the polymeric material is pH responsive.

18. The microfluidic device of claim 11 wherein the output orifice has a generally star-shaped cross-section.

19. The microfluidic device of claim 11 wherein the membrane is integrally formed with the body.

20. A method for modifying the value of a property of a fluid using a microfluidic device, comprising the steps of:
   providing a first flow path through the microfluidic device to accommodate the flow of the fluid therethrough;
   positioning a material having a volume in the first flow path, the volume of the material responsive to the value of the property of the fluid; and
   introducing a volume of a compensating fluid into the first flow path to vary the value of the property of the fluid, the volume of compensating fluid introduced varying in response to the volume of the material.

21. The method of claim 20 further comprising the step of providing a second flow path in the microfluidic device to accommodate the flow of the compensating fluid therethrough, the second flow path having first and second portions wherein the first portion communicates with the second portion through an orifice and the second portion communicates with the first flow path upstream of the material.

22. The method of claim 21 comprising the additional step of providing a material chamber in the microfluidic device transverse to and extending through the first flow path and communicating with the second flow path, the material positioned in the material chamber.

23. The method of claim 22 comprising the additional step of isolating the material from the second flow path.

24. The method of claim 23 comprising the additional step of wherein the step of isolating the material chamber from the second flow path includes the step of extending a membrane between the material chamber and the second flow path.

25. The method of claim 24 comprising the additional step of wherein the step of introducing the volume of the compensating fluid into the first flow path includes the steps:
   urging the membrane over the orifice in the first portion of the second flow chamber so as to limit the flow of compensating fluid therethrough in response to the value of the property of the fluid being a first value; and opening the orifice in the first portion of the second flow chamber so as to increase the flow of compensating fluid therethrough in response to the value of the property of the fluid being a second value.

26. The method of claim 21 wherein the volume of the compensating fluid is introduced into the first flow path a predetermined angle thereto.

27. The method of claim 26 wherein the predetermined angle is generally equally to 90 degrees.

28. The method of claim 21 wherein the compensating fluid is introduced into the first flow path such that the fluid and the compensating fluid flow in the first flow path are in a laminar arrangement.

29. The method of claim 28 comprising the additional step of engaging a portion of the material with the fluid and with the compensating fluid so as to vary the volume of the material.

* * * * *